Feb. 27, 1940.  H. J. ZIMMERMANN  2,191,552
DEVICE FOR MEASURING FUEL CONSUMPTION
Filed Feb. 17, 1939   5 Sheets-Sheet 2
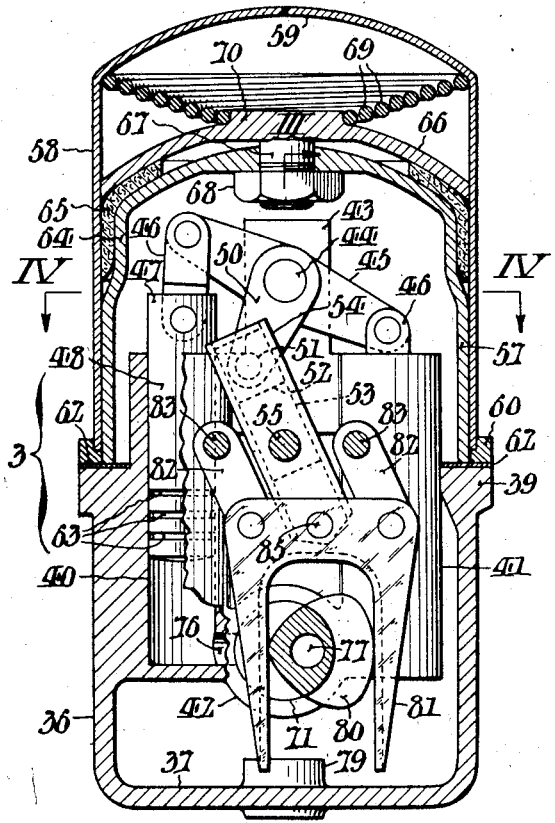
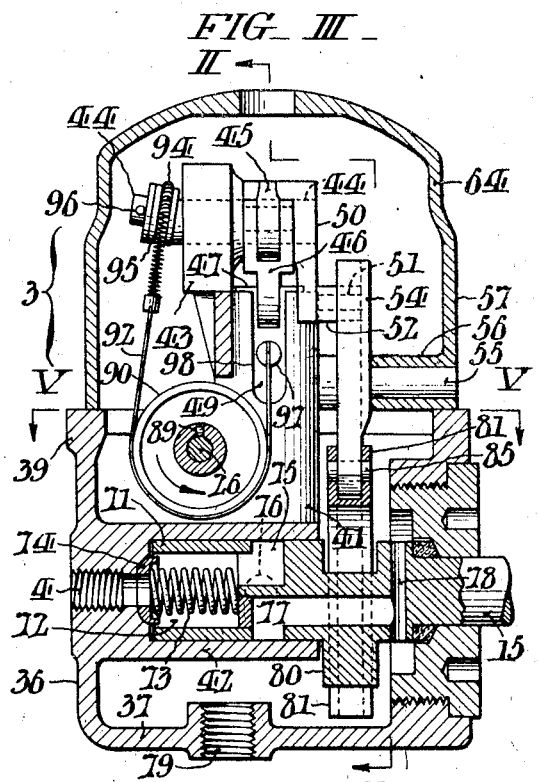
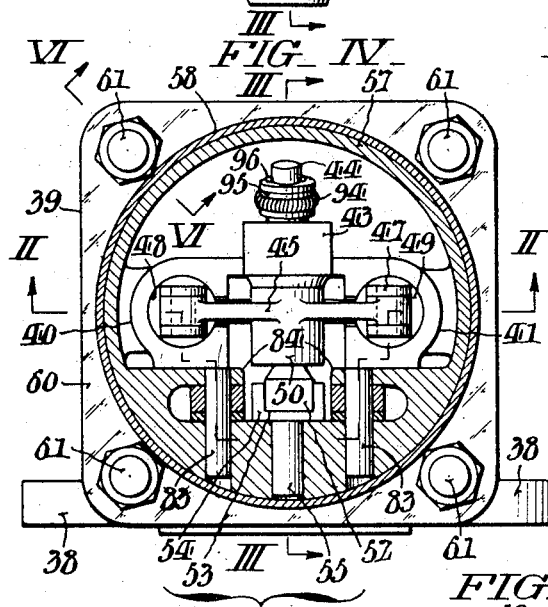
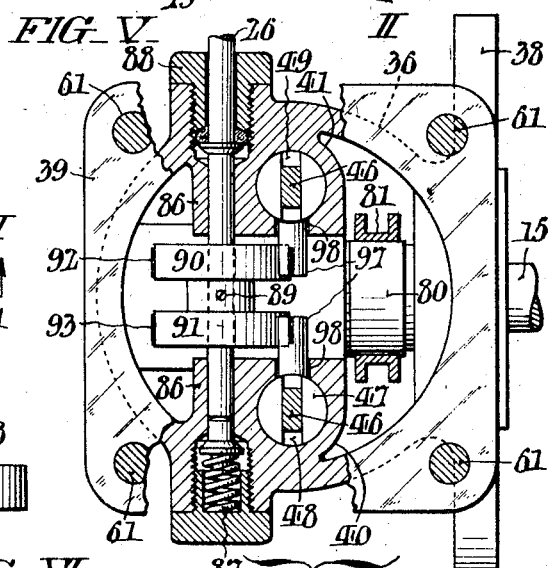
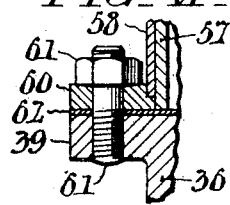
WITNESSES:
Thomas W. Kerr Jr.
William Ball Jr.
INVENTOR:
Hans J. Zimmermann,
BY Paul & Paul
ATTORNEYS.

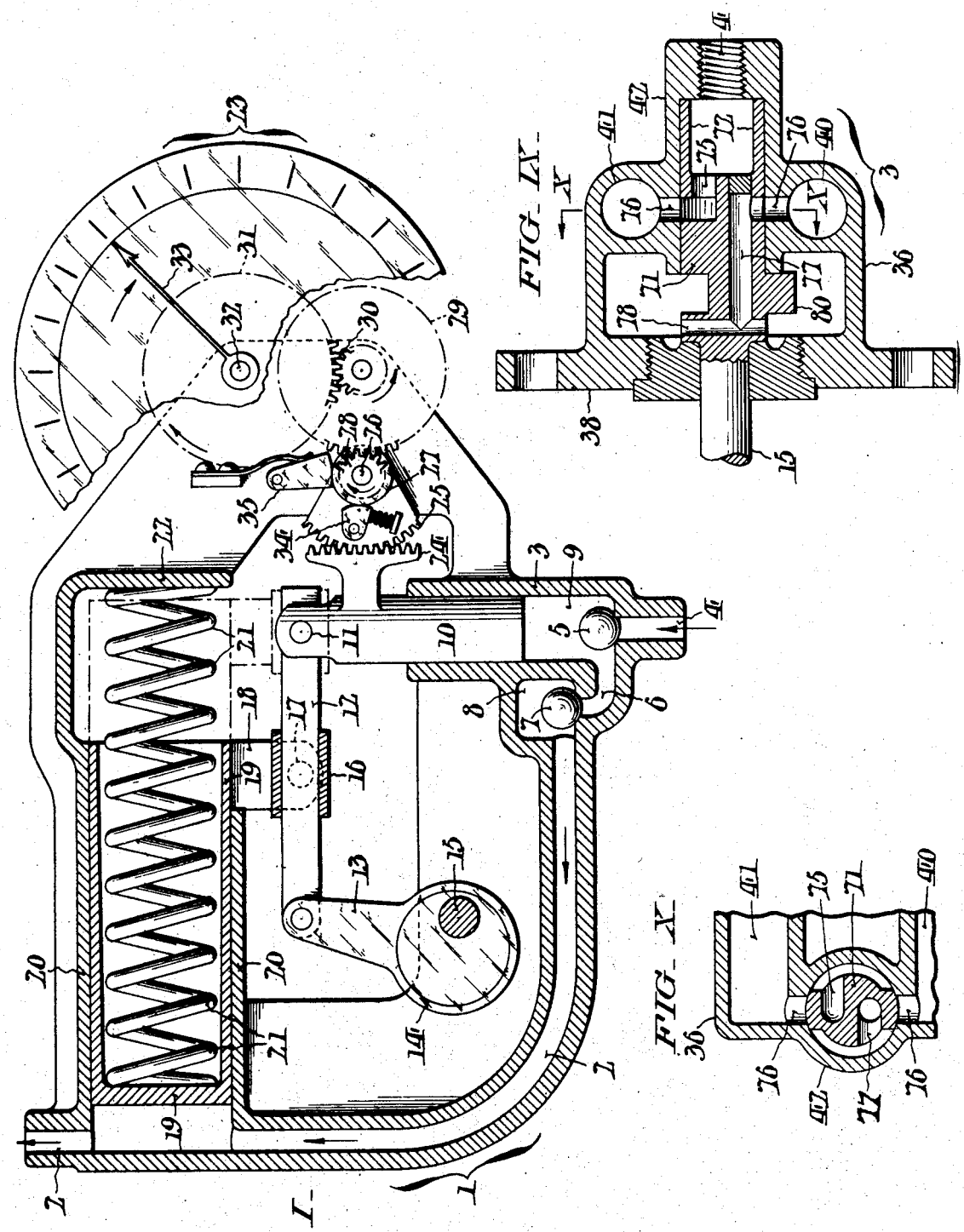

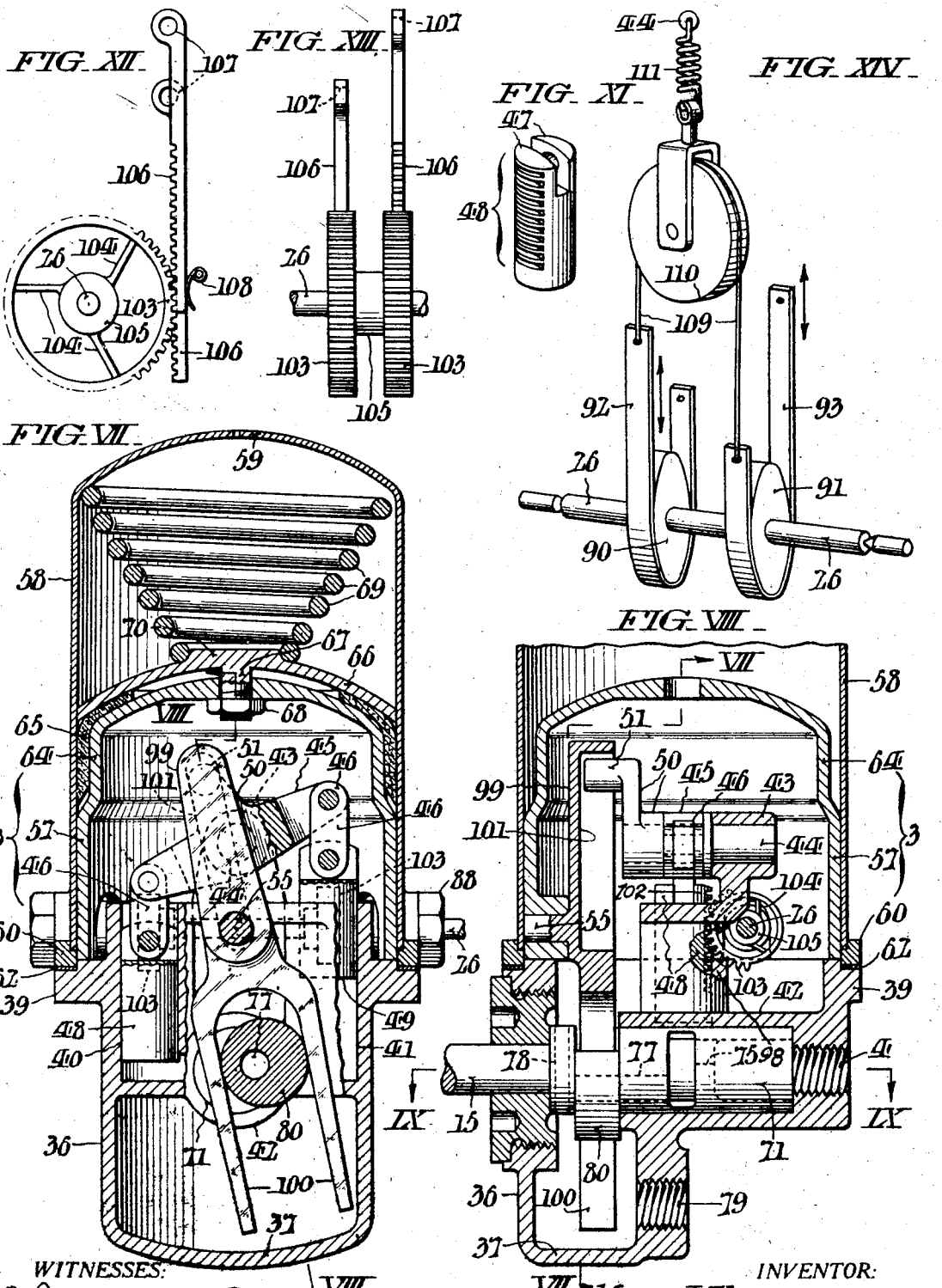

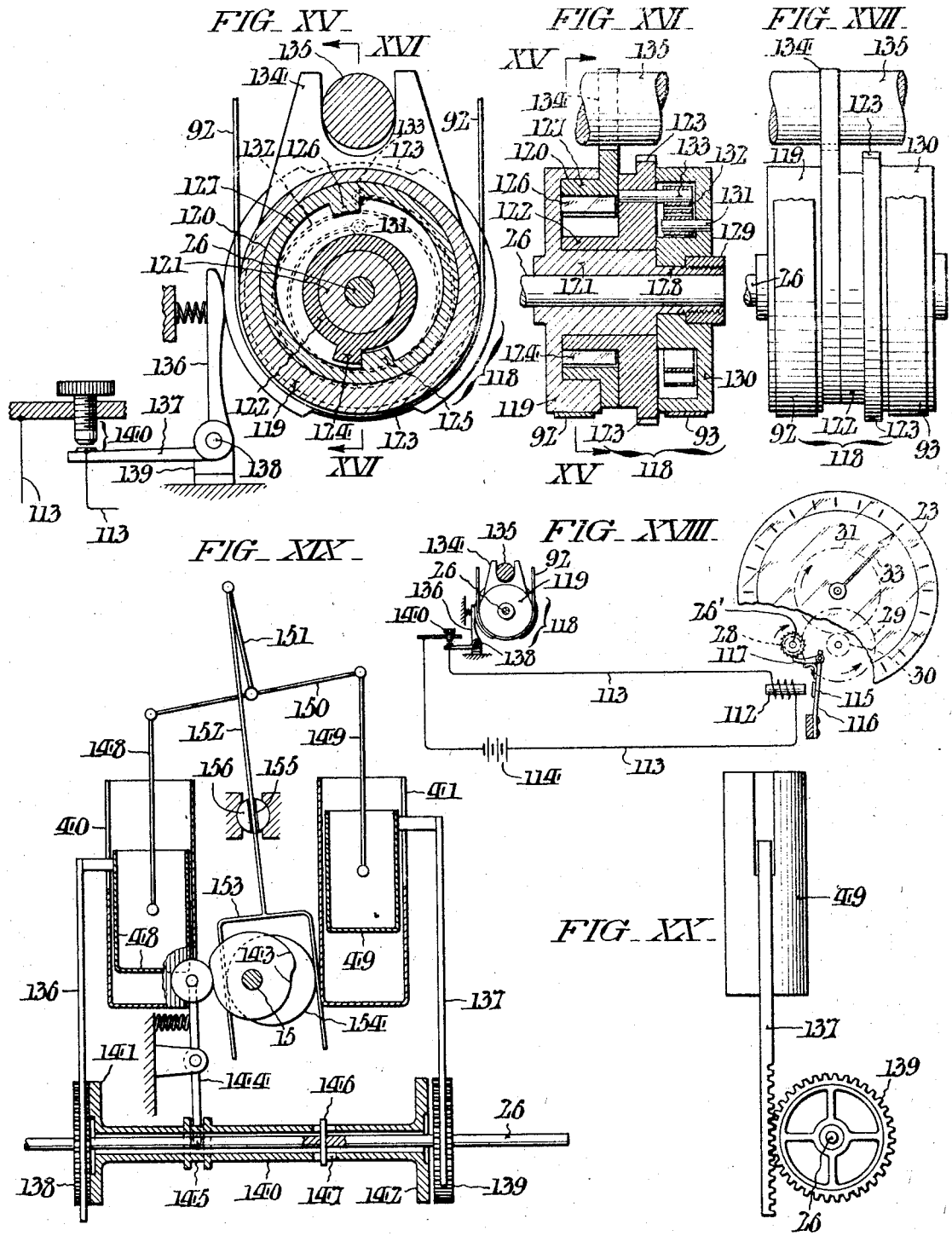

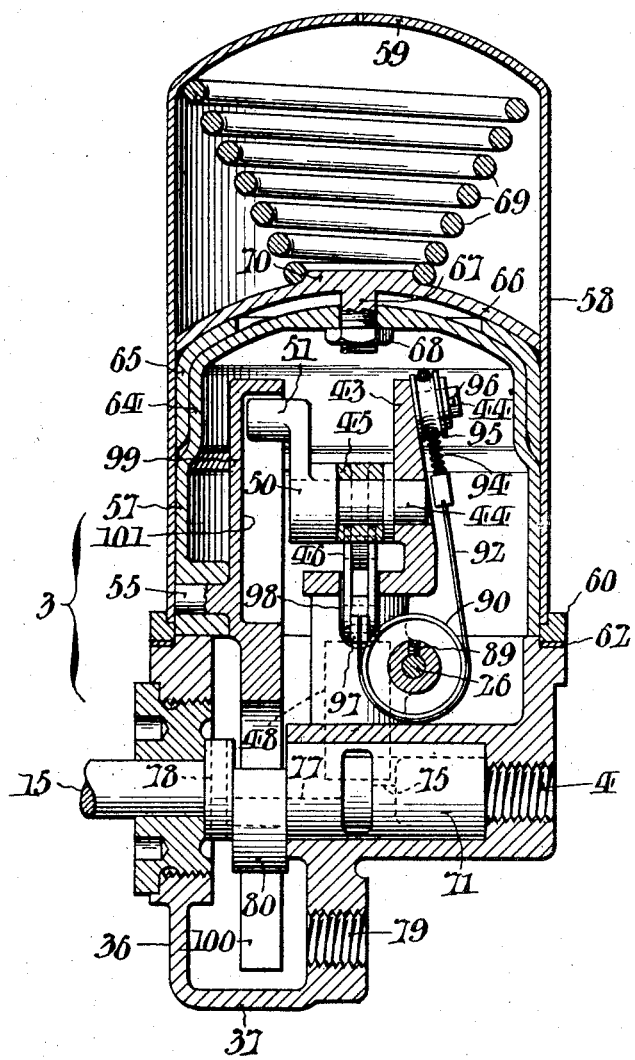

Patented Feb. 27, 1940

2,191,552

UNITED STATES PATENT OFFICE 2,191,552

DEVICE FOR MEASURING FUEL CONSUMPTION

Hans J. Zimmermann, Elkins Park, Pa.

Application February 17, 1939, Serial No. 256,853

16 Claims. (Cl. 73—198)

This invention relates in its broader aspects to flow meters for controlling the supply of combustible fuel to the cylinders of internal combustion engines and, more particularly, to the types of motor preferably used on aircraft.

Heretofore various means have been devised and methods adopted whereby the volume of a liquid passing through a pipe line could be measured, such for instance those used for metering water. Such meters, however, are only adapted for metering comparatively large volumes of liquid under a comparatively high pressure, but there are no accurate means by which relatively small quantities of liquid under low pressure may be measured, for example gasoline and other fuel oils for supply to internal combustion engines subject to variable load. Accordingly, there is an apparent need for an instrument or device capable of accurately metering and indicating the quantity of fuel used in motor-cars and especially aircraft motors. Hence it is highly desirable in connection with aircraft engines or motors to provide an effective means whereby when an indication is given regarding the amount of fuel actually consumed, and by simple deduction the quantity remaining in the tanks is easily determinable.

Conventional fuel indicators at present commonly used on aircraft, and especially on aeroplanes, are practically useless in regard to providing an accurate means of indicating the quantity of fuel remaining in the storage tanks unless the craft be flying on an even or straight course, as any attempt to ascertain the quantity of remaining fuel when flying otherwise obviously entails an inaccurate indication.

Water-meters usually include a rotary engine which drives a counter means, but for measuring fuel "consumption" the pressure is too low to properly motivate such a rotary engine efficiently and, furthermore, the specific amount of liquid used for each charge is so small that the result would be greatly impaired if only a small leakage occurred.

The present invention aims to eliminate all the noted disadvantages by providing a novel means fundamentally based on the principle of measuring the volume by the displacement of a pump, the capacity of which is automatically regulated according to the amount of fluid being used by varying the displacement of the pump or its stroke, and registering the displacements by aid of a suitable indicator, whereby the actual consumption of liquid per unit of time is accurately shown; such novel means being adapted for use instead of the conventional fuel pump for feeding the carburetor of an internal combustion engine.

Another object is to provide a consumption meter for liquids including a pump having a variable displacement and means for varying such displacement in accordance with the pressure of the liquid in the discharge line, and by suitable means indicating the quantity of liquid pumped or consumed.

A further aim of this invention is to provide a flow meter for liquids comprising a piston or pistons operating with variable stroke to pass liquid at the requisite rate to the consuming means or the like, with automatic means dependent upon the change in the rate of liquid consumption or utilization for controlling the length of the piston stroke, together with operatively coordinated means for indicating and, if desired, recording the rate of liquid flow, such means being well known and not illustrated herein, as determined by the length of the piston stroke and the number of strokes per unit of time.

A still further object is to provide a liquid meter comprising a variable stroke device including plural reciprocatory pistons in pump cylinders, a rotary valve to supply liquid to and deliver it from said cylinders alternately, a rocker for actuating the pistons, a rotary cam, eccentric or equivalent means for oscillating the rocker by aid of a pivotal element of variable leverage, a piston movable in accordance with the pressure of liquid in the discharge line of the device and by its movement determining the leverage of the pivotal element, and means for converting and summating the reciprocatory movements of the pump pistons into unidirectional rotary movements adapted to operate appropriate counter or other indicating or recording mechanism.

Further objects and ancillary advantages of this invention will be manifest from, or referred to in, the following description of the accompanying drawings, which typically illustrate practical embodiments of said invention; while the concluding claims more concisely express the features of novelty over the prior art.

In the drawings:

Fig. I is a mainly sectional view of a compacted embodiment of the invention as conveniently sustainable by, and as operatively coordinated to, an instrument-board indicator means.

Fig. II is a vertical section of another embodiment of the invention adapted for coordination with a remote indicator means, said section being taken approximately on the staggered plane II—II in Figs. III and IV.

Fig. III is a vertical section on the plane III—III of Figs. II and IV, with certain components in different position.

Fig. IV is a horizontal section, taken approximately on the plane IV—IV in Fig. II.

Fig. V is a similar section, taken substantially as designated by the arrows V—V in Fig. III.

Fig. VI is a detail section on the plane VI—VI of Fig. IV.

Fig. VII is a similar section to Fig. II, but showing a slightly different yoke mechanism intermediate the displacement means and the actuator means, said section being taken approximately as indicated by the lines and arrows VII—VII in Fig. VIII.

Fig. VIII is a vertical section, taken substantially on the plane VIII—VIII in Fig. VII, with parts differently positioned.

Fig. IX is a detail plan section on the line IX—IX in Fig. VIII.

Fig. X is a vertical fragmentary section, taken as indicated by the arrows X—X in Fig. IX.

Fig. XI is a perspective view of a piston detail hereinafter fully explained.

Fig. XII is a detail view of an intermittent drive hereinafter fully explained.

Fig. XIII is a view looking towards the right-hand of the preceding illustration.

Fig. XIV is a perspective view of a spring influenced intermittent drive later on fully described.

Fig. XV is a detail sectional view of a drive control for electrically actuating a remotely located indicator device, said view being taken on the plane XV—XV of Fig. XVI.

Fig. XVI is a sectional elevation on the plane XVI—XVI of the preceding view.

Fig. XVII is an elevation looking towards the left-hand of Fig. XV.

Fig. XVIII is a diagrammatic illustration showing how the means of Figs. XV—XVII is electrically coordinated to a remote indicator device.

Fig. XIX is a schematic sectional view of a further modified form of the invention; and, Fig. XX is a detail view hereinafter more fully explained.

Referring more in detail to the drawings, and first to Fig. I, the embodiment of the invention therein disclosed is conveniently adapted for application to the rear side of an instrument board and conveniently comprises an open frame 1 including an integrally formed flow conduit portion 2, leading from a suitable pump 3, having an inlet 4 from any source of liquid or fuel storage, not shown, said inlet being provided with a non-return ball valve 5. The pump 3 is also provided with an outlet connection 6, likewise under control of a ball valve 7, and said outlet communicates into a chamber 8 from which the conduit portion 2, aforesaid, connects to the carburetor of the engine or motor, not shown. Slidably fitting the bore 9 of the pump 3 is a plunger or piston 10 having fulcrumed to its upper end at 11, one end of an actuator member 12 in turn operatively coupled by a strap 13 to an eccentric 14 on a power shaft 15 journaled in the frame 1, and driven by any appropriate means, not shown. Mounted on the actuator member 12 is a rocker sleeve 16 having pivot connection at 17 to an arm 18 integral with a hollow piston 19 operating in a cylinder portion 20 of the frame 1, and under the influence of a co-axial spring 21, intervening its inner end and an abutment 22 projecting laterally from the frame 1.

Now, it will be readily apparent that as the pump piston 10 is reciprocated by the means just described that fuel will be pumped from storage by way of the inlet 4, past the valves 5 and 7 into the conduit portion 2, and, as the pressure on the latter builds up—due to throttling of the discharge to the carburetor for example—the piston 19 will be forced toward the right-hand in Fig. I in opposition to the spring 21. Concurrent with this movement of the piston 19, the sleeve 16 will be correspondingly progressed along the actuator member 12, whereby the effective stroke of said piston is automatically decreased, incidental to reduction in the leverage distance intervening the pivot parts 11, 17, and the pumping capacity likewise diminished. With constant flow of fuel from the conduit portion 2, the piston 10 will, obviously, retain a definite position defined by the normal discharge pressure opposed to the expansive effect of the spring 21; whereas any variation in the discharge will effect a change in the position of the pivot 17 relative to the longitudinal dimension of the member 12, whereby the pumping stroke of the piston 10 is automatically changed in direct accord with the continuous or intermittent withdrawals from the discharge conduit 2; or, the quantity of liquid or fuel controlled by the device described in any unit of time equals the addition of the lengths of the strokes multiplied by the area of the piston 10, which is constant.

In order to transmit the reciprocatory variables of the piston 10 to a suitable counter or indicator 23, said piston 10 is provided with a rack 24 in mesh with a toothed sector 25 freely turnable on an appropriately journaled transmission shaft 26, said shaft having rigidly secured thereon a friction drive 27 with an integrally formed pinion 28, said pinion meshing with a gear 29 having a concentric pinion 30, in turn operatively engaging a further gear 31 on the shaft 32 carrying a pointer or finger 33 coactive with the indicator 23. Operative coaction between the sector 25 and the friction drive 27 is effected by means of a spring-influenced camming pawl 34 adapted to frictionally rotate the drive 27 forwardly in a clockwise direction as indicated by the arrow when the piston 10 rises. On the contrary, an oppositely effective spring-influenced camming pawl or latch 35 prevents any back motion of the pinion 28 and associated gears 29, 31. It will be thus remarked that the pointer finger 33 will be intermittently stepped over the dial of the indicator 23 in a clockwise direction from one graduation to another; while it will be equally apparent the pinion 28 and gears 29, 31 are positively and intermittently rotated in one direction only, whereby the number of revolutions per unit of time, and progress of the pointer finger 33, correspond exactly to the addition of the length of the piston strokes. Consequently it will be clear definite provision is afforded to measure the amount of fuel which the pump 3 handles during any unit of time.

Referring now to Figs. II-VI more particularly, which illustrate a modified form of variable-stroke pump device 3, the same comprising a hollow cylindric cup-portion 36 with a closed-in bottom 37, an attaching flange 38, and a connector flange 39. Formed integrally within the cup-portion 36 are spaced cylinders 40, 41 with an intervening bearing portion 42 at the lower part and an upwardly-directed bracket 43 at the upper portion, with an axis pin 44 rigidly secured therein. Pivotally mounted on the axis pin 44 to one side of the bracket 43 is a rocker arm 45, having at the free ends forks 46 in turn fulcrumed between upwardly projecting ears 47 integral with pistons 48, 49 respectively operative in the cylinders 40, 41 aforesaid; while the rocker arm 45 also includes a crank portion 50 having a pin 51 on which is freely mounted a rectangular element 52, in turn afforded slidable guidance in the groove 53 of an oscillatory member 54 pivotally sustained by a pin 55 in a radial bearing 56 integral with a hollow or substantially bell-shaped piston 57, operative in a cylindrical cover 58 having a domed end 59 and attaching flange 60, whereby said cover can be clamped to the connector flange 39 of the cup portion 36, hereinbefore referred to, as by stud bolts 61, in an obvious manner, with interposition of an appropriate sealing gasket 62. Each of the pistons 48, 49 may be fitted with suitable packing rings 63, Fig. II, if desirable. The hollow piston 57, it will be seen, is diametrically reduced at the inner end portion 64 for reception of a suitable cup ring 65 which is held in place by a concavo-convex disc 66 having an axial screw-threaded stud 67, engaging through the correspondingly apertured end of the portion 64, for application of a clamp nut 68 for effecting a fluid-tight operative connection between the piston 57 and the inner surface of the cylindrical cover 58. The piston 57 is loaded by a spring 69 intervening a central embossment 70 on the outer face of the disc 66 and the inner part of the dome end 59.

For controlling flow of the liquid or fuel entering the pump 3 by way of a suitable connection to the inlet port 4, use is made of a rotary valve 71 operative in a bore of the bearing 42 below the cylinders 40, 41; said valve embodying a cavity 72 housing a spring 73 intervening the inner end of said cavity and a centering member 74 seating in a complemental recess around the inner end of the inlet port 4. The rotary valve 71 is formed with a suction passage 75 for alternate communication with respective cylinders 40, 41 by way of radial ports 76, best shown in Figs. IX and X; and an exhaust passage 77 for discharge from said cylinders by way of the ports 76, said passage 77 and a diametric outlet 78 in the valve body for discharge into the cup portion 36 of the device 3, and from thence through a discharge port 79 and appropriate conduit, not shown, to a carburetor.

In order to operatively coordinate the motion of the rotary valve 71 with the rocker arm 45, said valve is provided with an eccentric cam 80. Coactive with the cam 80 is a fork member 81 which is supported by parallel links 82, in turn pivotally sustained by pins 83 afforded bearing in apertured projections 84 integral with the hollow piston 57. Particular attention is directed to the fact that the lower end of the oscillatory member 54 is connected by a pivot pin 85 to the fork member 81 and mid-way between, as well as in the same plane as that of the pivotal connection of the parallel links 82; or said parts constitute a parallel motion. It is also to be remarked that the cam 80 is not circular but of a shape so that the fork member or shoe 81 will remain substantially stationary in its extreme positions until the rotary valve 71 completes its effective movements.

Referring now to the means for translating the reciprocatory movements of the pistons 48, 49 into rotary movement for the indicator operating shaft 26; said shaft in this form of the invention is journaled in appropriate bearings 86 within the pump cup section 36 and has a thrust device 87 at one end, and a packing gland 88 around that portion projecting out of the cup section 36. Rigidly secured on the shaft 26, as by a set screw 89, is a roller having spaced rims 90, 91 about which are trained steel bands 92, 93, respectively, said bands being connected together by a coil spring 94, which loops over a grooved roller 95 rotative on an upwardly-inclined and reduced extension of the axis pin 44, while the roller 95 is held in position by a cotter pin 96, in an obvious manner. The free or opposing ends of the bands 92, 93, in turn are connected to radial pins 97, secured in the pistons 48, 49 and afforded guidance in slots 98 through the confronting walls of the respective cylinders 40, 41. Thus it will be readily understood that the friction of the steel bands 92, 93 on the spaced rims 90, 91 varies; as the piston 49, for example, commences to elevate, that part of the spring 94 coordinated with the associated band 92 will exert a tension on the latter and effect rotative movement of the shaft 26 in the direction of the arrow in Fig. III for example, and vice versa, as the piston 48 elevates a corresponding action will take place with respect to the band 93 on the rim 90, whereby the shaft 26 is continuously rotated in a definite direction. Otherwise expressed, the respective bands 92, 93 are alternatingly-active upon and slide over the rims 90, 91, whereby the shaft 26 is continuously rotated.

Referring now to the modification of Figs. VII-IX, inclusive, all parts having their equivalents in Figs. II-VI, as well as IX and X, are correspondingly designated by like reference indicia, and only the differing structure will be herein described, to obviate unnecessary repetitive matter. In the first place it will be seen that the eccentric cam 80 associated with the rotary valve 71 is circular, and the means operatively coordinating said cam with the rocker arm 45 is of elongated Y formation having the leg portion 99 pivotally supported in the bell-shaped piston 57 by a pin 55 as before set forth; while the paralleling bifurcations 100 engage the cam 80, in an obvious manner. In addition, the leg portion 99 is longitudinally grooved at 101 for coaction with the pin 51 of the rocker arm crank portion 50, which it is to be observed projects upwardly, instead of downwardly as before described. Now it will be readily understood that as pressure builds up below the bell-shaped piston 57, said piston will commence to rise and, as the coordinating Y member 99, 100 is connected thereto by the pin 55 it will be correspondingly elevated, so that the stroke of the pump pistons 48, 49 will be reduced because the axis of the pin 55 will be moved nearer to the pivot pin 51 of the crank portion 50 until said axis and pin coincide when the stroke of said pistons will be nothing; whereupon the rocker arm 45 comes to a position of rest and the pistons 48, 49 will cease to operate until discharge of the liquid or fuel from the discharge 79 is resumed. Furthermore, instead of employing the pulley rim and band motion-translating means 90—93 hereinbefore described, in this form of the invention the respective pistons 48, 49, are each provided with a longitudinal rack 102 operative in the cylinder slots 98, see Fig. VIII, said rack meshing with the toothed rim 103 of an intermittently active friction drive, including flexible arms 104 integral with a hub 105 fast on the shaft 26; and it will be readily understood that when the respective toothed rim 103 turns counter-clockwise, for example, said rim will slide over the outer ends of the flexible arms 104, but when the rim 103 is moved clockwise it will grip the free ends of the arms 104 and thereby become coupled to the shaft 26 and cause intermittent rotation of the latter in the same direction. It will be readily apparent that the pulley rim and band motion-translating means 90—97 of Figs. III and V may be equally well applied with this form of the invention as illustrated in Fig. XXI, the only difference being that the bracket 43 is preferably provided with an axis pin 44' for support of the grooved roller 45 above the pin 44 hereinbefore referred to; accordingly corresponding reference characters are employed to obviate unnecessary repetitive explanation.

Instead of the racks 102 being formed integral with the pistons 48, 49, they may be made as independent members 106, Figs. XII and XIII, with connector eyes 107, whereby they are pivotally attachable to appropriate means such as the radial pins 97, Figs. III and V; and in which case suitable means such as springs or the like 108, Fig. XII, will be employed to keep them in operative mesh with the toothed rims 103, in an obvious manner.

Also, instead of the steel bands 92, 93 being connected by a coil spring 94 as before set forth in connection with Figs. III–V, they may be coupled by a wire 109 which passes around a sheave 110, Fig. XIV, in turn suspended by a spring 111, coupled at its upper end to the axis pin 44 in any suitable manner, and whereby the bands 92, 93 will be retained sufficiently taut for alternating operative coaction about the spaced rims 90, 91, so that the shaft or spindle 26 is consequently turned only in one direction to an extent corresponding to the summation of the lengths of the successive delivery strokes of the pistons 48, 49.

A further modified manner of converting the reciprocatory movements of the pistons 48, 49,—more particularly adapted for the actuation of a remote counter or indicator means,—into unidirectional rotary motion is shown in Figs. XV–XVIII. In this form of means, which may be used with the transmission shaft 26 of Figs. VII and VIII, the counter or indicator 23 being located at a remote position relative to the pump device 3, the operation of such indicator is, preferably, effected by an electro-magnet 112, in circuit by wires 113 with a battery or the like 114, said electro-magnet when intermittently energized attracting a contact 115 on a flexible arm 116 having a spring-influenced detent 117 coactive with the ratchet pinion 28 on a shaft 26' controlling operation of the indicator 23. In order to prevent the circuit 113 remaining closed when the pump device 3 ceases operation, use is preferably made of the means 118 shown to best advantage in Figs. XV–XVII, inclusive. This means 118 comprises a disc drive 119 having an eccentric bearing recess 120, and a hub 121 free on the shaft 26. A flanged sleeve 122 freely fits the hub 121 and has diametrically opposed circumferential-recesses 123 and a stop projection 124; said projection 124 alternatingly coacting with radial projections 125, 126 in a circumferentially-flanged float ring 127, rotatively journaled in the disc eccentric bore 120. The disc hub 121 is also reduced at 128 for rigid attachment, as by a coupler nut 129 of a companion annularly-recessed drive 130, in the hollow of which is secured, by a pin 131, one end of a spirally-wound spring 132, the other end whereof is connected to a pin 133 carried by the flanged sleeve 122 aforesaid. It is also to be observed that the flanged-ring 127 is provided with a fork projection 134 engaging a stationary pin 135, whereby said ring is confined to vertical movement for a purpose now to be explained. Assuming the bands 92, 93 are respectively applied to the disc drive 119 and companion drive 130, it will be readily understood that after each half-revolution of the drives 119 and 130, the stop projection 124 and therewith the flanged sleeve 122 becomes free to rotate, and being influenced by the spring 132 is turned thereby; whereas the float ring 127 by virtue of the parts 134, 135 is prevented from rotation. In other words, both drives 119 and 130 being free on the shaft 26, rotation of either one will cause the eccentric bore 120 to change its vertical position, thus moving the radial projection 125 out of the path of or engagement with the stop projection 124, and, at the same time, place the projection 126 in the path of said projection 124; whereupon under the recoil influence of the spring 132 the stop projection 124 makes a half-revolution and will be automatically placed in contact with the projection 126. Also incidental to rotation of the sleeve 122, each time it makes a one-half revolution one or the other of its recesses 123 is engaged by the spring-influenced arm 136 of a bell-crank lever 137 pivoted at 138 to a stationary member 139 whereby a circuit is closed through the wires 113 through the medium of contact device 140. As a result, the electro-magnet 112 is intermittently energized to attract the contact 115 and flexible arm 116 and, through the mechanism described, by aid of the detent 117 correspondingly and incrementally moves the indicator finger 33 in a definite direction. Thus it can never happen that the contact 140 should remain continuously closed during operation of the device 3.

Referring now to Figs. XIX and XX, which diagrammatically disclose another way of converting the reciprocating movement of the pistons 48, 49 into rotary movement of the shaft 26, two racks 136, 137, respectively engage gears 138, 139 loosely mounted on the shaft 26. A tubular shaft 140, concentric with the shaft 26, having friction discs 141, 142 at its ends, is moved longitudinally by a two-stage cam 143, on the power shaft 15, and spring-influenced pivoted lever 144 engaging a groove 145 on said tubular shaft, each time the pistons 48, 49 are in their extreme positions, so as to couple the friction discs 141, 142 alternately to the rack gears 138, 139. The tubular shaft 140 is connected to the coaxial indicator actuating shaft 26 by means of a pin 146 engaging in a slot 147 in said tubular shaft. In addition, the pistons 48, 49 are coupled by rods 148, 149 to a rocker arm 150 having a medial arm 151 rigid therewith; and the rod 151 has a pivotally pendent rod 152 having a forked end 153 engaging a circular eccentric cam 154, said rod being afforded guidance through the diametric orifice 155 of an oscillating guide member 156; and the guide member 156 is raisable and lowerable in parallel with the axis of the cylinders 40, 41, in order to impart a variable stroke to the respective pistons 48, 49 as set forth in connection with Figs. II–VI, or Figs. VII and VIII.

From the foregoing it is thought the initially stated objects will be well understood from the specific structural forms of embodiment of the invention which have been fully described.

Having thus described my invention, I claim:

1. A device for metering the consumption of liquid comprising positively driven pumping structure having variable displacement, means to vary the length of the stroke of the pumping structure in accordance with the pressure of liquid in a discharge line from said structure, and means actuated in accordance with the stroke of the pumping structure to indicate the actual quantity of liquid pumped and consumed.

2. A device for metering the consumption of liquid to a means of utilization thereof, said device comprising positively-driven pumping means with mechanism capable of varying the length of the stroke, means to vary the stroke of the pumping means in accordance with the quantity of liquid utilized, and means actuated in accordance with the stroke of the pumping means adapted to indicate the total quantity of liquid utilized whereby the volume remaining available for use is readily deducible.

3. A device for metering the consumption of liquid comprising pumping structure having pistons therein operative alternatingly under variable stroke, means for automatically regulating the length of the piston stroke including a cylindrical cover with an auxiliary hollow piston therein, said hollow piston being influenced by variation in the pressure on the delivery side of the pumping structure, a parallel linkage with an intervening oscillatory lever pivotally supported by said hollow piston, said linkage and lever supporting a fork at their lower ends, a rotary cam coactive with said fork, a pivotal rocker coupling the respective pump pistons together, and means operatively connecting the rocker pivot to the oscillatory lever above the pivot axis of the latter with capacity for relative sliding movement.

4. A device for metering the consumption of liquid comprising a closed-in pump structure comprising upper and lower hollow sections, spaced cylinders in the lower section with pistons therein operative alternatingly under variable stroke, a rotary valve in the lower section controlling supply to and delivery of liquid from the respective cylinders alternatingly, a rocker member connecting the upper ends of the respective pistons, said rocker having a medial crank arm, a pressure influenced piston in the upper section of the closed-in structure actuable by the pump pressure, parallel links with an intervening oscillatory lever pivotally sustained in a common plane, means operatively connecting said links and lever with the pressure influenced piston in the upper structure section, a fork pendently carried by the aforesaid parallel links and oscillatory lever lower ends, a slidable connector coupling the rocker crank arm to the oscillatory lever above the pivot axis of the latter, and a rotary cam cooperative with the pendent fork for effecting operation of the cylinder pistons to pass liquid to means for using it at a desirable rate of flow.

5. A device for metering the consumption of liquid as defined in claim 4, wherein the slidable connector coupling between the rocker crank arm and the oscillatory lever comprise a lateral pin on said arm with a relatively pivotal element, said element being afforded guidance in a rectangular groove above the oscillatory lever axis of movement whereby the ratio of the leverage is changeable by movement of the pressure influenced piston under the action of the pump delivery pressure, and the actuator cam is of such shape as to retain the fork substantially stationary in its extreme positions until the rotary valve completes its effective movements.

6. A device for metering the consumption of liquid fuel comprising a closed-in structure including spaced cylinders having pistons therein respectively operative under variable stroke, a rotary control in the structure for supplying the fuel to and delivering it from said cylinders alternately, means for operating the rotary control, means for reciprocating said pistons, means for oscillating the reciprocating means under variable extent, a reactive member in the closed-in structure and a suitable loading means for the reactive member, said reactive member being movable by pressure fluctuations in a discharge from said structure and also by such movement determining the action of the piston reciprocating means, and correlated means converting the reciprocatory movements of the pistons aforesaid into intermittent unidirectional rotary movement of an associated transmission shaft.

7. A device for metering the consumption of liquid fuel in accordance with claim 6, wherein the means for oscillating the reciprocating means consists of a lever fork-shaped at one end and longitudinally grooved in its leg portion, said lever being pivotally supported by the reactive member, a circular eccentric coacts with the lever fork-shaped end, and a pin and freely-sustained coupler element connects the lever grooved leg to the means for reciprocating the pistons.

8. A device for metering the consumption of liquid fuel in accordance with claim 6, wherein the means for converting reciprocatory movement into intermittent unidirectional rotary motions comprises racks carried by the respective cylinder pistons, and friction gears including engageable spiders fast on the transmission shaft impart intermittent rotary movement to the latter.

9. A device for metering the consumption of liquid fuel comprising a closed-in hollow structure including spaced cylinders with pistons therein and respectively operative under complemental variable stroke, a rotary valve in the closed-in structure for supplying the fuel to and delivering it from said cylinders alternately, means for operating said valve, rocker means for reciprocating said pistons, a correlated fork-ended pivotal means of variable leverage, cam means on a power shaft coactive with the pivotal means forked end for oscillating the rocker means, a reactive member in the hollow structure correlated with the pivotal means, suitable loading means for the reactive member, said reactive member being movable in accordance with the pressure in a discharge conduit therefrom and by varying movement determining the leverage of the pivotal means, a transmission shaft, and means for converting the reciprocatory movements of the pistons aforesaid into unidirectional rotary movements of said transmission shaft.

10. A device for metering the consumption of liquid fuel in accordance with claim 9, wherein the closed-in hollow structure comprises lower and upper hollow sections adapted for rigid securement together, the reactive member is bell-shaped and spring loaded, and the correlated fork ended pivotal means includes parallel links with a pendent fork, said links being all pivotally carried by the bell-shaped reactive member, and one of said links is coupled to the fork and the reactive member in a manner whereby it follows the same angular movements as the other of said link.

11. A device for metering the consumption of liquid fuel in accordance with claim 9, wherein the rotary valve controlling supply of fuel to and its delivery from the spaced cylinders forms a part of the power shaft of the device.

12. A device for metering the consumption of liquid fuel in accordance with claim 9, wherein the means for converting the reciprocatory movements of the pistons into unidirectional rotary movements of the transmission shaft comprises a rack carried by each pumping cylinder piston, a geared annulus meshes each said rack, and inclined spokes fast on the transmission shaft individually and rotatively support said annuli, whereby each annulus is alternatingly rotatable in one direction only while the other is free for sliding movement over the outer ends of its spokes.

13. A device for metering the consumption of liquid fuel in accordance with claim 9, wherein the means for converting reciprocatory into rotary movement comprises spaced members fast on the transmission shaft, steel bands pass about said spaced members with one of their respective ends coupled to radial projections from the spaced cylinder pistons, a coil spring connects their other ends, and means for supporting the coil spring intermediate its ends in such manner as to alternately effect unidirectional driving of, and sliding movement of the steel hands over, the spaced members aforesaid.

14. A device for metering the consumption of liquid fuel in accordance with claim 9, wherein the means for converting reciprocatory into rotary movement comprises spaced gears free on the transmission shaft, a hollow concentric shaft having friction discs at the ends intervenes the spaced gears, a pin-and-slot connection operatively coordinates the transmission and hollow shafts, a two-stage cam on the power shaft of the device, and a reactively-influenced lever intervening the two stage-cam and the hollow shaft to effect its alternating and synchronous actuation with the transmission shaft.

15. A device for metering the consumption of liquid fuel in accordance with claim 9, wherein the transmission shaft is provided with relatively rotatable spaced disc drives, one of said drives having an eccentric bearing recess and the other a concentric recess, a flanged sleeve is rotatively mounted on the hub of the eccentrically recessed drive, a floating ring fits in said eccentric recess, a coil spring is connected at one end in the concentrically recessed disc drive and at the other end to the flanged sleeve, means whereby the floating ring is confined to vertical movement, and means whereby the flanged sleeve is intermittently restrained to unidirectional half-revolutions.

16. A device for metering the consumption of liquid fuel in accordance with claim 9, wherein the transmission shaft is provided with a unidirectional rotative flanged sleeve and means for operating said sleeve, the flanged portion has opposed circumferential recesses coactive with a circuit closing device, a correlated circuit including an electromagnet effective to incrementally motivate a remote indicator and the flanged sleeve portions intermediate the opposed recesses aforesaid prevent said circuit closing device remaining continuously in active position.

HANS J. ZIMMERMANN.